United States Patent
Tan et al.

(10) Patent No.: US 11,076,050 B2
(45) Date of Patent: Jul. 27, 2021

(54) SYSTEM AND METHOD FOR IMPROVING CONTACT CENTER OPERATIONS BY OPTIMIZING USER CONNECTIONS

(71) Applicant: Prosodica, LLC, Deerfield, IL (US)

(72) Inventors: Mariano E. Tan, Deerfield, IL (US); Jake Schmitz, Deerfield, IL (US); Brian D. Eng, Deerfield, IL (US); Navneet R. Garg, Deerfield, IL (US)

(73) Assignee: Prosodica, LLC, Deerfield, IL (US)

( * ) Notice: Subject to any disclaimer, the term of this patent is extended or adjusted under 35 U.S.C. 154(b) by 50 days.

(21) Appl. No.: 16/157,802

(22) Filed: Oct. 11, 2018

(65) Prior Publication Data

US 2019/0116266 A1    Apr. 18, 2019

Related U.S. Application Data

(60) Provisional application No. 62/571,370, filed on Oct. 12, 2017.

(51) Int. Cl.
*H04M 3/523* (2006.01)
*H04M 3/51* (2006.01)
*G10L 15/26* (2006.01)

(52) U.S. Cl.
CPC ....... *H04M 3/5235* (2013.01); *H04M 3/5141* (2013.01); *H04M 3/5158* (2013.01); *H04M 3/5191* (2013.01); *H04M 3/5231* (2013.01); *G10L 15/26* (2013.01)

(58) Field of Classification Search
CPC .......................... H04M 3/5231; H04M 3/5158
USPC ................................................ 379/265.05
See application file for complete search history.

(56) References Cited

U.S. PATENT DOCUMENTS

| | | | |
|---|---|---|---|
| 8,538,006 B1* | 9/2013 | Noble, Jr. | H04M 3/51 379/265.06 |
| 8,897,437 B1 | 11/2014 | Tan et al. | |
| 9,106,750 B2* | 8/2015 | Klemm | H04M 3/5233 |
| 10,091,349 B1 | 10/2018 | Rao et al. | |
| 2005/0047581 A1* | 3/2005 | Shaffer | H04M 3/523 379/265.11 |
| 2010/0054431 A1* | 3/2010 | Jaiswal | H04M 1/2745 379/88.04 |
| 2015/0288818 A1* | 10/2015 | Srivastava | G10L 15/26 379/88.01 |
| 2017/0116177 A1* | 4/2017 | Walia | G06F 40/35 |

* cited by examiner

*Primary Examiner* — Ahmad F. Matar
*Assistant Examiner* — Jirapon Intavong
(74) *Attorney, Agent, or Firm* — Ice Miller LLP (57) ABSTRACT

A system that greatly improves contact center operations by converting inbound calls from communicating devices to outbound calls to the communicating devices. The system can include a call response agent that receives the inbound call from the communicating device, a speech-enabled automated agent that that interacts with the communicating device to receive an audio signal, a classifier that analyzes the audio signal and determines a caller request based on the audio signal, and a request package generator that creates an unallocated request package based on the caller request. The request package generator can create an unallocated request package menu, including the unallocated request package, and send the unallocated request package menu to a plurality of agent workstations.

21 Claims, 4 Drawing Sheets

SYSTEM AND METHOD FOR IMPROVING CONTACT CENTER OPERATIONS BY OPTIMIZING USER CONNECTIONS

CROSS REFERENCE TO RELATED APPLICATION

This application claims priority to and the benefit of U.S. Provisional Patent Application No. 62/571,370, filed Oct. 12, 2017 and titled "System and Method for Improving Contact Center Operations by Optimizing User Connections," which is incorporated herein by reference in its entirety.

FIELD OF THE DISCLOSURE

The present disclosure relates to telephony systems in contact centers, and, more particularly to a system and method for converting inbound calls to outbound calls in contact centers.

BACKGROUND OF THE DISCLOSURE

Contact centers typically handle both inbound and outbound calls for call centers. These contact centers may be referred to as inbound/outbound (IO) contact centers. Such IO contact centers transceive (i.e., receive and transmit) large numbers of calls over existing telephony systems and networks, including, for example, cellular telephone systems or networks, satellite telephone systems or networks, landline telephone systems or networks (e.g., Public Switched Telephone Network (PSTN)), local area networks (LANs), wide area networks (WANs), the Internet, etc. Contact centers typically include centralized offices that facilitate and manage calls between agent workstations and caller communicating devices over telephony systems or networks.

IO contact centers typically receive inbound calls from communicating devices such as mobile telephone devices. Such calls are typically initiated by callers who are seeking assistance with products or services. The calls are typically forwarded to agent workstations where operator agents can assist the callers with their particular product or service needs.

IO contact centers may also make outbound calls from agent workstations and connect those outbound calls over telephony systems or networks to communicating devices such as mobile telephone devices. The outbound calls may originate from agent workstations. The agent workstations can be used by operator agents who may be focused on a list of individuals that they would like to contact regarding products or services.

IO contact centers tend to be afflicted by three key flaws that are commonly found in inbound contact center operations. Namely, contact center operations tend to have low resource utilization, poor call experiences due to routing calls to agent workstations operated by underprepared operator agents, and low job satisfaction of operator agents due to the lack of working autonomy, as well as the emotional downside of participating in poor call experiences. There exists an unmet need for a system and a method that can maximize resource utilization and efficiency, and that can enhance call experiences by routing and connecting the caller communicating device to an agent workstation optimally suited to handle the particular call.

SUMMARY OF THE DISCLOSURE

The disclosure addresses key flaws in contact center operations. More specifically, the disclosure addresses low resource utilization, poor call experiences due to routing calls to agent workstations of underprepared operator agents, and low job satisfaction of operator agents due to the lack of working autonomy as well as the emotional downside of participating in poor call experiences.

The disclosure provides an inbound/outbound (IO) call system and an IO call assignment method that greatly improve contact center and call center operations. The IO call system can comprise a call-response (CR) agent that interacts with a communicating device over a network; a request package (RP) generator that generates and provides an agent workstation with an unallocated request package menu; and a request package (RP) allocator that receives a request package selection from the agent workstation and assigns the selected request package to that agent workstation, wherein the RP allocator ensures selection of all unallocated request packages by one or more agent workstations. The RP allocator can facilitate the assignment of a request package to an agent workstation. The RP generator can include gamification that increases a likelihood that all unallocated request packages are promptly selected by agent workstations. The RP allocator can connect and establish a call session between an agent workstation that selected a request package and the communicating device associated with that request package. The RP allocator can carry out all appropriate pre-call steps to ensure that the caller request can be resolved during the call session.

The CR agent can include a speech-enabled automated agent. The CR agent can include a conversation BOT. The CR agent can receive, analyze, and classify each caller request, allowing the caller to describe their needs using any terminology they prefer. The CR agent can classify multipart caller requests. The CR agent can include speech recognition and non-linear classifiers to classify both the caller request type and the caller request valence. The non-linear classifiers can include support vector machines.

The RP generator can create request packages and provide the generated request packages to the RP allocator.

The RP generator can generate an interactive request package menu that can be displayed by the agent workstations and receive an operator agent selection at the agent workstation. An operator agent can view caller requests and choose the caller requests the operator agent would like to, and is skilled at fulfilling. The game mechanics (i.e. gamification) in the RP generator can create incentives for operator agents to select all caller requests, including the caller requests that are more complicated or require higher levels of skill.

The IO call system can include a caller notification unit that generates and sends a status update to a communicating device that is associated with an unallocated request package. The caller notification unit can employ multiple modes of communication to provide the status update to the communicating device. The status update can be sent to the communicating device once the associated request package is assigned to an agent workstation. The status update can be sent before the call session is established between the agent workstation and the communicating device. Once a call session is established and a voice connection made, voice and speech analysis can be carried out by a call analytics unit to monitor and rate the quality of the interaction between the caller and the operator agent. Results of the analysis can be sent to the agent workstation for the purposes of improving operator agent performance. The results can be sent to the CR agent for refining classification of incoming caller requests.

According a non-limiting aspect of the disclosure, an inbound-outbound call system that converts an inbound call from a communicating device to an outbound call to the communicating device is provided. The inbound-outbound call system comprises a call response agent that receives the inbound call from the communicating device, a speech-enabled automated agent that that interacts with the communicating device to receive an audio signal, a classifier that analyzes the audio signal and determines a caller request based on the audio signal, and a request package generator that creates an unallocated request package based on the caller request. The RP allocator can facilitate the assignment of a request package to an agent workstation. The request package generator can create an unallocated request package menu and include the unallocated request package in the unallocated request package menu. The unallocated request package menu can be sent to an agent workstation and rendered on a display device at the agent workstation. The unallocated request package can be selected from the unallocated request package menu by an agent workstation.

The inbound-outbound call system can comprise a request package allocator that assigns the unallocated package to the agent workstation. The request package allocator can comprise an outbound dialer that can initiate an outbound call to the communicating device and connect the communicating device with the agent workstation.

The inbound-outbound call system can comprise a caller notification unit that generates and sends a status update message to the communicating device. The status update message can include a status of the caller request. The status update message can be sent to the communicating device after the request package allocator assigns the unallocated request package to the agent workstation.

The inbound-outbound call system can comprise a gamified request broker that ensures that all unallocated request packages are selected by one or more agent workstations. The gamified request broker can prioritize and incentivize selection of higher priority unallocated request packages by the one or more agent workstations. Game mechanics can enhance the operator agents' intrinsic motivation to perform efficiently and at high levels.

Unallocated request packages can be prioritized based on at least one of a level of urgency, a degree of complexity, or a degree of effort required to respond to the caller request. An unallocated request package can comprise at least one of a request type, a complexity level, a caller type, an urgency level, and an emotion descriptor.

The inbound-outbound call system can further comprise a recorder that stores the audio signal, including a natural interaction between a caller on the communicating device and the speech-enabled automated agent.

The inbound-outbound call system can further comprise a transcriptor that transcribes a natural interaction between a caller on the communicating device and the speech-enabled automated agent.

According to another non-limiting aspect of the disclosure, a method is provided for converting an inbound call from a communicating device to an outbound call to the communicating device. The method comprises receiving the inbound call from the communicating device, interacting with the communicating device by a speech-enabled automated agent to receive an audio signal, analyzing the audio signal to determine a caller request, and creating an unallocated request package based on the caller request.

The method can comprise creating an unallocated request package menu and including the unallocated request package in the unallocated request package menu.

The method can comprise sending the unallocated request package menu to a plurality of agent workstations to be rendered on display devices at the agent workstations.

The method can comprise receiving a request packet selection from one of the plurality of agent workstations and assigning the unallocated request package to said one of the plurality of agent workstations.

The method can comprise initializing an outbound call and calling the communicating device and connecting the communicating device with the said one of the plurality of agent workstations.

The method can comprise generating a status message that indicates that the unallocated request package is assigned to said one of the plurality of agent workstations and sending the status message to the communicating device.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Call center interactions typically involve chance connections between communicating devices and agent workstations. Typically, a call is initiated from a communicating device to a general phone number and the call is routed to an agent workstation that is selected from a pool of available agent workstations, and a communication session is established between the communicating device and that agent workstation. Sometimes an interactive voice response (IVR) interface provides the communicating device with a menu that allows the caller to select a general reason for calling; and, often, the communicating device must wait in a queue before being connected to the selected agent workstation. While this method reasonably optimizes utilization of a pool of agent workstations, while also minimizing the waiting time of communicating devices in queue, it tends to create sub-optimal call experiences. This is due to three factors: (i) the generalization of the caller's request; (ii) the random assignment and routing of the call to the next available agent workstation; and (iii) the expectation that once connected, the caller's request should be fulfilled before disconnecting.

Generalization fails because caller requests are often nuanced and multipart, thereby defying simple assignment and routing of calls. For instance, a caller may initiate a call to inquire about an aspect an article (e.g., whether the article is available in a specific location), but request information about another aspect of the article (e.g., trouble-shooting to resolve a failure of the article to function). The result is that caller requests tend to be poorly understood when connecting the communicating device to the agent workstation.

Random assignment and routing of calls from communicating devices to agent workstations fails because the operator agents at the selected workstations are not universally proficient at all caller requests. Therefore, the odds that a call is routed and connected to the agent workstation of an optimally skilled operator agent are persistently low. Phrased differently, the odds that the communicating device is connected to an agent workstation that is operated by a sub-optimally skilled operator agent are high. The fact that the call is only very generally classified further reduces the likelihood of optimal assignment and routing of the call from the communicating device to the appropriate agent workstation.

Given the issues above, it is highly unlikely that a call will be successfully routed to the appropriate agent workstation without the benefit of the inbound/outbound (IO) call system and IO call assignment method provided herein, resulting in unsuccessful call outcomes. For instance, after a call is assigned and routed to a particular agent workstation, and the full nature of the caller request is communicated to the agent workstation, the operator agent at the randomly assigned agent workstation makes a best attempt to resolve the request. In straightforward cases, caller requests are fulfilled, though often not as efficiently as possible, however, more complicated caller requests often result in escalations or call backs, thereby providing evidence that the original call connection—that is, communicating device to agent workstation assignment and connection—was inappropriate.

These call assignment and routing failures underlie the main operational challenges of call centers. The need to categorize and assign calls into a small number of pre-defined call request types increases the subtle variations within those call request types, thereby requiring a broader set of skills on the part of the assigned operator agent, which increases training time and lengthens time-to-competence for new operator agents. The random assignment of call requests of varying complexity creates stressors on operator agents by randomly introducing failures into their work, which leads to lower job satisfaction and high voluntary attrition. Persistence in trying to fulfill every caller request in a single call, even though the operator agent connected may be inappropriately skilled, lowers resolution rates, further increases on-phone times, and lowers overall call satisfaction. The IO call system and IO call assignment method solve these failures and greatly improve contact center operations.

Figure 1:
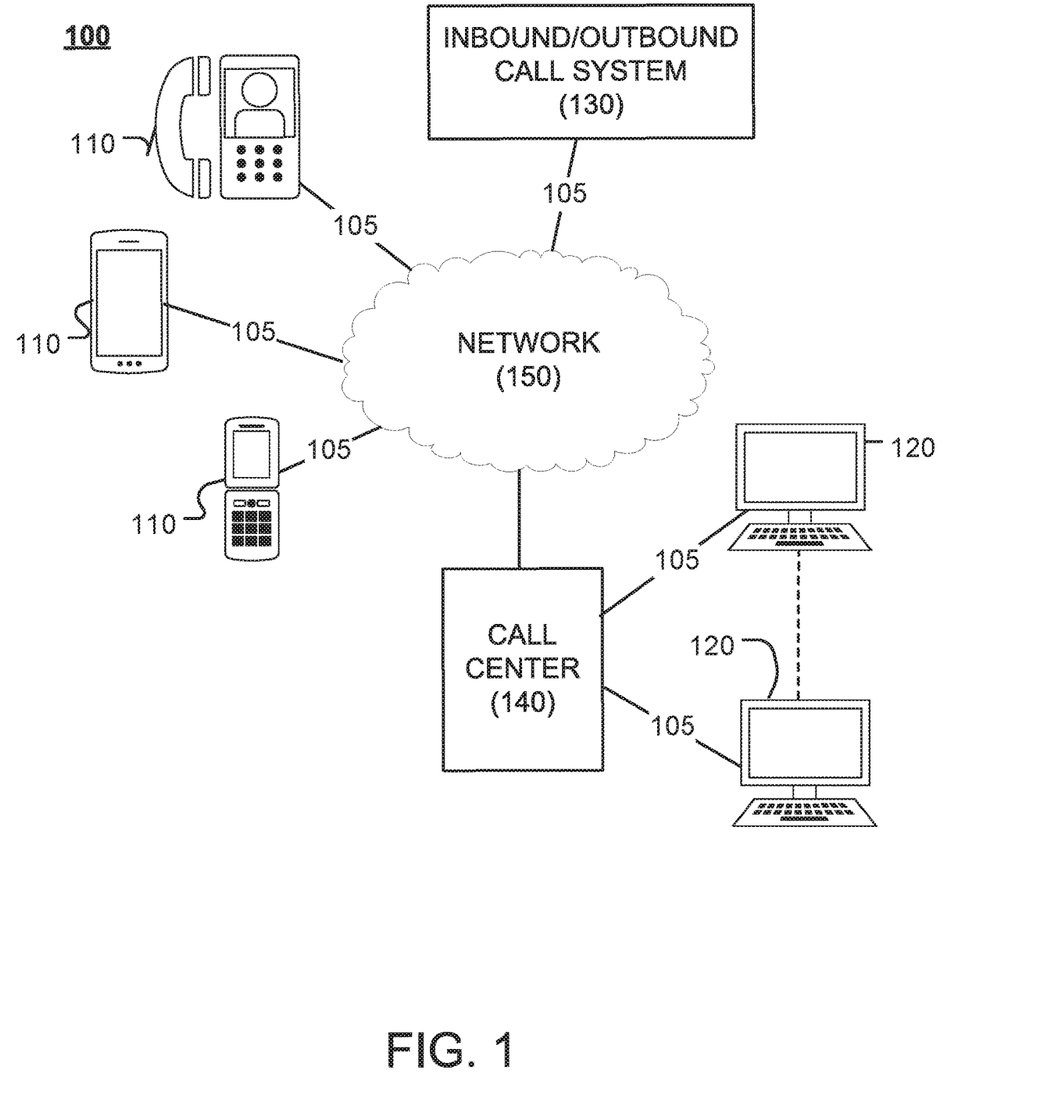
FIG. 1 shows an example of a communication system, constructed according to the principles of the disclosure.

FIG. 1 shows an example of a communication system 100, constructed according to the principles of the disclosure. The communication system 100 includes an inbound/outbound (IO) call system 130. The communication system 100 can include one or more communicating devices 110, one or more agent workstations 120, a call center 140, and a network 150. The call center 140 can include or be connected to the one or more agent workstations 120. Each of the components in the communication system 100 can be connected by one or more communication links 105.

The IO call system 130 can include one or more servers (not shown). The IO call system 130 can be provided as a single integrated system housed in a single, common location, or in multiple systems provided at different locations and configured to communicate and work together. The IO call system 130 can be included in or connected to a contact center (not shown), which in turn can be connected to or included in the call center 140. The IO call system 130 can be co-located with the call center 140, or included in the call center 140, or located elsewhere, remote from the call center 140. The IO call system 130 can include a controller 200, shown in FIG. 3 and described below.

Figure 2:
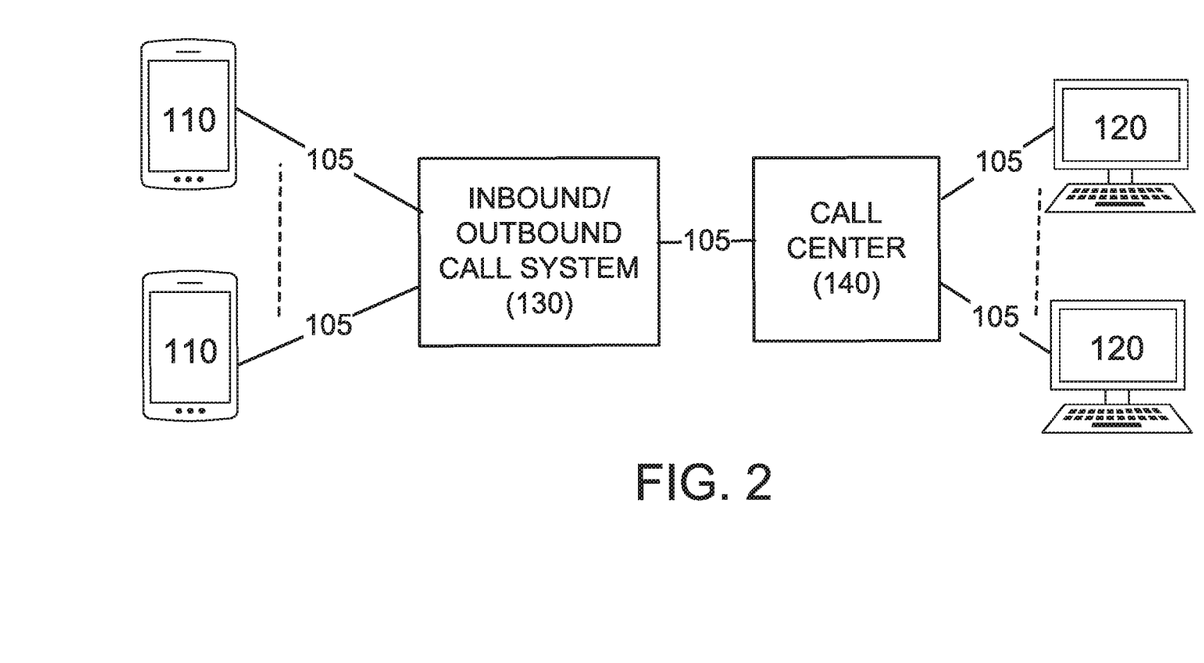
FIG. 2 shows a block diagram of an example of an IO call assignment process carried out by a IO call system in FIG. 1.

FIG. 2 shows a block diagram of an example of an IO call assignment process carried out by the IO call system 100. As seen in FIG. 2, a call can be initiated by a communicating device 110 over a communication link 105 and received by the IO call system 130 as an inbound call. The IO call system 130 can receive one or more additional inbound calls from other communicating devices 110 over communication links 105. Upon receiving the inbound call from the communicating device 110, the IO call system 130 can establish a call session with that communicating device 110. Once the call session is established, an interactive voice response (IVR) signal can be generated and transmitted by a conversational BOT 270A (shown in FIG. 4) to the communicating device 110 to interactively engage the caller in a natural language dialogue. The IO call system 130 can generate and communicate an open-ended query to the communicating device 110, such as, for example, "what can I help you with?" The IO call system 130 can then receive the reply signal from the communicating device 110, analyze the reply signal, and classify the caller request in the response signal (e.g., "my smart thermostat device is not working and I need help troubleshooting"). The IO call system 130 can generate a request package based on the caller request and pipeline the call as an outbound call. The received caller request can be classified according to its type (e.g., "assistance with a TYPE 3 smart thermostat") and complexity (e.g., "high complexity, requiring knowledge of electrical circuitry and operation of TYPE 3 smart thermostat") and a request package generated, including the caller request, and transmitted as an unallocated request package to a request package (RP) administrator 275B (shown in FIG.). The RP administrator 275B can receive, organize and manage all request packages. The RP administrator 275B can send new request packages to a request package (RP) database, or send updated request packages to the RP database, such as, for example, request packages that have been assigned or resolved. The RP database (not shown) can be populated with all request packages, including all unresolved (or open) request packages. Each request package can be stored as a unique record or file in the RP database, which can include a field that identifies the request package as resolved or unresolved. The RP database can be located in the IO call system 130 or the call center system 140, or elsewhere in the communication system 100.

The RP database (not shown) can be accessed by the IO call system 130 and an unallocated request package (RP) menu generated. The unallocated RP menu can be generated in coordination with the RP administrator 275B (shown in FIG. 4). The unallocated RP menu can be transmitted to and displayed at one or more of the agent workstations 120. The IO call system 130 can generate a request package (RP) interface (not shown), which can be received and displayed by each agent workstation 120. The RP interface can include a graphic user interface (GUI) that is displayable on the agent workstations 120 and that includes one or more fields to receive data or instructions from the operator agents. An agent workstation 120 can receive data or an instruction from an operator agent and select an unallocated request package from a plurality of unallocated request packages in the unallocated RP menu in response to the operator agent entry. The agent workstation 120 can transmit a request package (RP) selection to the IO call system 130, indicating selection of a particular unallocated request package by the agent workstation 120.

The transmitted RP selection can include RP data packets, each having a packet header that includes source identifying information for the agent workstation 120 that sent the RP selection, such as, for example, an IP address, MAC address, telephone number, telephone extension, or the like. The packet header can include a timestamp that identifies the transmission date/time of the RP selection, which can be referenced when scheduling an outbound call to the communicating device 110 related to the unallocated request package. The RP data packets have payloads that can include information about the selected unallocated request package, such as, for example, an RP index value, a caller request, a description of the caller request, a request type, a request complexity, or the like.

Upon receiving the RP selection from the agent workstation 120, the IO call system 130 can assign the selected unallocated request package to that agent workstation 120 and update the associated record in the RP database with the assignment data. The assignment data can include addressing information for the agent workstation 120, such as, for example, the IP address, MAC address, telephone number, telephone extension, or the like, which can be parsed from the RP selection data packets. The IO call system 130 can connect and establish an outbound call session between the agent workstation 120 that selected the unallocated request package and the communicating device 110 associated with that request package. The call can be initiated and routed through the IO call system 130 after receiving a call instruction from the agent workstation 120. Appropriate pre-call steps can be carried out to ensure that the caller request can be resolved during the outbound call session.

The IO call system 130 can generate and send a status update to the communicating device 110 that is associated with the selected unallocated request package. Multiple modes of communication can be employed to transmit the status update to the communicating device 110. The status update can be sent to the communicating device 110 once the associated request package is assigned to the agent workstation 120. The status update can be sent before the call session is initiated between the agent workstation 120 and the communicating device 110. Once the call session is initiated and established, and a voice connection made, voice and speech analysis can be carried out to monitor and rate the quality of the interaction between the caller and the operator agent. Results of the analysis can be sent to the agent workstation 120 for the purposes of improving operator agent performance. The analysis results can be stored and referenced subsequently for refining classification of later incoming caller requests.

Figure 3:
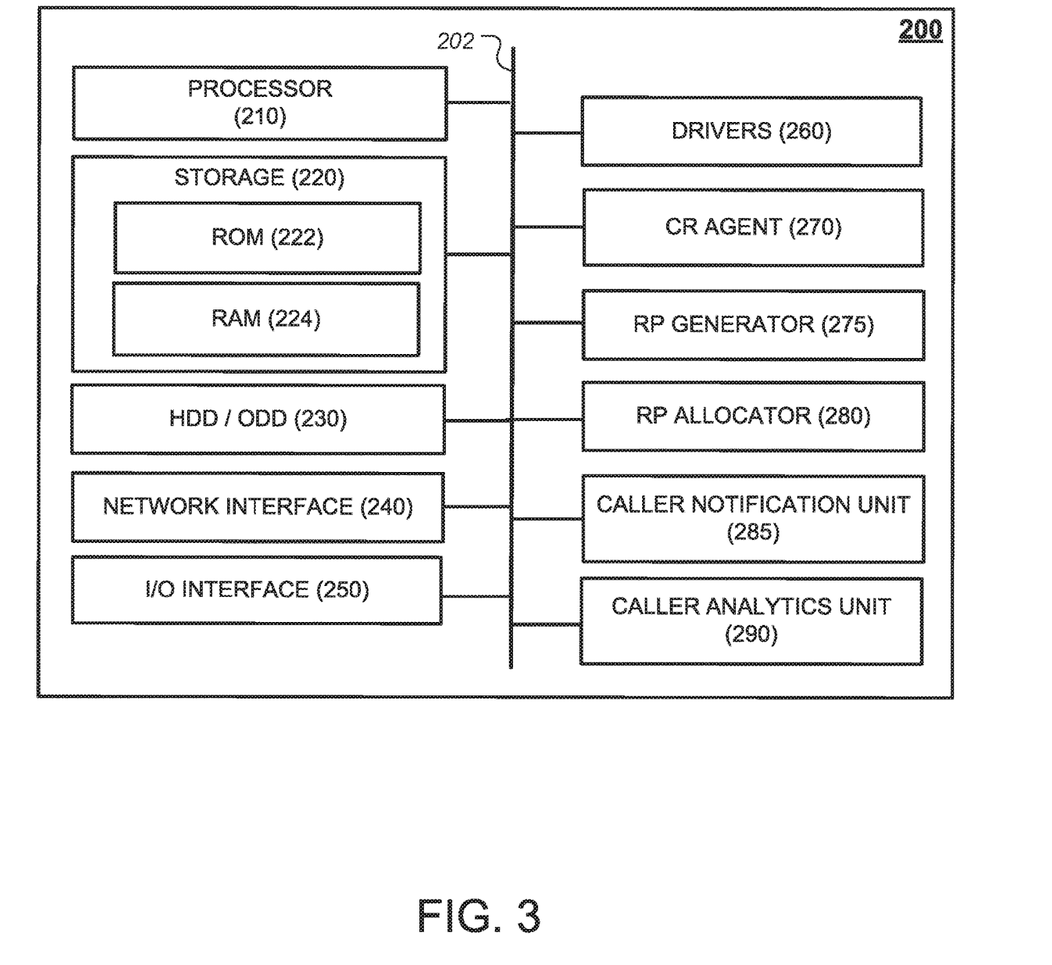
FIG. 3 shows a block diagram of an example of a controller that can be included in the IO call system in FIG. 1.

FIG. 3 shows a block diagram of an example of a controller 200 that can be included in the IO call system 130 (shown in FIGS. 1 and 2). As seen in FIG. 3, the controller 200 can be configured to implement the various aspects of the IO call system 130. The controller 200 includes a processor 210, a system storage 220, and a system bus 202. The system bus 202 communicatively connects components in the controller 200, including, but not limited to, the system storage 220 to the processor 210. The processor 210 can include any of various commercially available processors. Dual microprocessors and other multi-processor architectures can also be employed as the processor 210. The processor 210 includes a computing device.

The system bus 202 can be any of several types of bus structures that can further interconnect to a memory bus (with or without a memory controller), a peripheral bus, or a local bus using any of a variety of commercially available bus architectures.

The system storage 220 includes a read only memory (ROM) 222 and random access memory (RAM) 224. A basic input/output system (BIOS) can be stored in the ROM 222, which can include a non-volatile memory, such as, for example, a ROM, an EPROM, an EEPROM, or the like. The BIOS contains the basic routines that help to transfer information between components within the controller 200, such as during start-up. The RAM 224 can include a high-speed RAM such as a static RAM for caching data.

The controller 200 can include an internal hard disk drive (HDD) and/or an optical disk drive (ODD) 230. The HDD can include, for example, an enhanced integrated drive electronics (EIDE) drive, a serial advanced technology attachments (SATA) drive, or the like. The ODD can include, for example, a CD-ROM (not shown), a DVD, or any read/write high capacity optical media. The HDD/ODD 230 can be configured for external use in a suitable chassis (not shown). The HDD/ODD 230 can be connected to the system bus 202 by a hard disk drive interface (not shown) and an optical drive interface (not shown). The hard disk drive interface (not shown) can include a Universal Serial Bus (USB) (not shown), an IEEE 1394 interface (not shown), and the like, for external applications. The HDD/ODD 230, and their associated computer-readable media, can provide nonvolatile storage of data, data structures, computer-executable instructions, or the like. The HDD/ODD 230 can accommodate the storage of any data in a suitable digital format.

One or more computer executable programs can be stored in the HDD/ODD 230 and/or RAM 224, including an operating system (not shown), one or more application programs (not shown), one or more application program interfaces (APIs, not shown), other computer programs (not shown), and program data (not shown). Any (or all) of the operating system, application programs, APIs, computer programs, and program data may be cached in the RAM 224.

The controller 200 can include a network interface 240 and an input/output (I/O) interface 250. The controller 200 can receive instructions and data via the I/O interface 250, which can be connected to one or more input/output devices, including, for example, a keyboard (not shown), a mouse (not shown), a pointer (not shown), a microphone (not shown), a speaker (not shown), a display (not shown), an image sensor, a camera, or the like. The received commands and data can be forward to the processor 210 from the I/O interface 250 via the bus 202.

The controller 200 can include a display device (not shown). The display device can be connected to the system bus 202 via the I/O interface 250. The display device (not shown) can be connected to a video driver (not shown) in the drivers 260 via the system bus 202.

The controller 200 can include a sound reproduction device (not shown), such as, for example, a speaker. The sound reproduction device (not shown) can be connected to the system bus 202 via the I/O interface 250. The sound reproduction device (not shown) can be connected to an audio driver (not shown) in the drivers 260 via the system bus 202.

The network interface 240 can be connected to the network 150 (shown in FIG. 1). The network interface 240 can include a wired or a wireless communication network interface (not shown). The network interface 240 can include wired or a wireless modem (not shown). When used in a local area network (LAN), the controller 200 can be connected to the LAN network through the wired or wireless communication network interface; and, when used in a wide area network (WAN), the controller 200 can be connected to the network through the wired or wireless modem. The modem (not shown) can be internal or external to the network interface 240 or the controller 200, and wired or wireless. The modem can be connected to the system bus 202 via, for example, a serial port interface (not shown).

According to an aspect of the disclosure, the IO call system 130 can create and store call detail records (CDRs) for each inbound and outbound call. The CDR data can be stored in a database (not shown) that can be located in the IO call system 130, or located locally with or remotely from the IO call system 130 and accessible to the IO call system 130 over a communication link. The CDRs can be created and analyzed as described in U.S. Pat. No. 10,091,349, titled "Fraud Detection System and Method," issued Oct. 2, 2018, the entirety of which is incorporated herein by reference.

The controller 200 can include a call-response (CR) agent 270, a request package (RP) generator 275, a request package (RP) allocator 280, a caller notification unit 285, and/or a caller analytics unit 290.

Referring to FIGS. 1 and 3, the CR agent 270 that can interact with the communicating devices 110 over the network 150 (shown in FIG. 1). The CR agent 270 can include a speech-enabled automated agent, such as, for example, a conversation BOT 270A (shown in FIG. 4). The CR agent 270 can interact with and receive audio signals from the communicating devices 110, analyze the received audio signals, and classify each caller request in the received audio signals. The audio signal can include a verbal description by a caller that describes the caller's needs using any terminology the caller prefers, including natural language. The CR agent 270 can classify multipart caller requests. The CR agent 270 can include speech recognition and non-linear classifiers to classify both the caller request type and the caller request valence. The non-linear classifiers can include support vector machines. The CR agent 270 can be connected to other components in the controller 200 via the bus 202.

The RP generator 275 can create request packages based on the caller requests received from the communicating devices 110. The RP generator 275 can include a request packager 275A (shown in FIG. 4) that creates the request packages, and an RP administrator 275B (shown in FIG. 4) that can receive, organize and manage all request packages. The RP generator 275 can include source addressing information in each generated request package. The source addressing information can accurately identify the communicating device 110 from which a caller request is received, and the time at which the caller request was received. As noted above, the RP administrator 275B can send new or updated request packages to the RP database. The newly created request packages can be stored as unallocated request packages in the RP database (not shown). The RP generator 275 can generate an unallocated request package (RP) menu that includes one or more request packages that have not been assigned to an agent workstation 120. The RP generator 275 can query the RP database and/or the RP administrator 275B and assemble unallocated request packages into the unallocated RP menu. The unallocated RP menu can include a list of unallocated request packages. The unallocated RP menu can include a list of caller requests. The RP generator 275 can transmit the unallocated RP menu to one or more agent workstations 120—for example, via bus 202, network interface 240, communication link 105, and network 150—as an unallocated RP menu rendering application.

The unallocated RP menu rendering application can include markup language annotations for identifying content and creating structured documents, including images, text, links, sounds, and other objects. The markup language annotations can include a plurality of tags for displaying the unallocated RP menu on the agent workstations 120. The markup language can include, for example, Standard Generalized Markup Language (SGML), Scalable Vector Graphics (SVG), Hypertext Markup Language (HTML), Extensible Markup Language (XHTML or XML), XML User Interface Language (XUL), LaTeX, and the like. The markup language annotations can be transmitted as a markup language file that can be executed by, for example, a web browser running on the agent workstations 120 to render the unallocated RP menu on the display devices.

The unallocated RP menu rendering application can include style sheet language annotations for providing rules for stylistics and for describing the presentation of the content and document with the markup language annotations. The style sheet language annotations can include, for example, colors, fonts, layouts, and other stylistic properties. The style sheet language can include, for example, Cascading Style Sheet (CSS), Document Style Semantics and Specification Language (DSSSL), Extensible Stylesheet Language (XSL), and the like. The style sheet language annotations can be provided as an unallocated RP menu style sheet language file. Alternatively, the style sheet language annotations can be incorporated into the file containing the markup language annotations.

The unallocated RP menu rendering application can include scripting language instructions to create interactive effects related to the markup language annotations or style sheet language annotations. The scripting language can include, for example, Bash (e.g., for Unix operating systems), ECMAScript (or JavaScript) (e.g., for web browsers), Visual Basic (e.g., for Microsoft applications), Lua, Python, or the like. The scripting language instructions can include instructions that when executed by, for example, the web browser on the agent workstations 120 effect rendering of an interactive unallocated RP menu on the display devices of the agent workstations 120. The scripting language instructions can be provided as an unallocated RP menu scripting language file. Alternatively, the scripting language instructions can be incorporated into the file containing the markup language annotations.

The unallocated RP menu rendering application can include a document object model (DOM) such as for HTML or XML (e.g., DOM5 HTML) that can create object-oriented representations of the content or documents that can be modified with the scripting language instructions. A DOM includes a cross-platform and language-independent convention for representing and interacting with objects in HTML, XHTML/XML, SGML, SVG, XUL, or the like. As used herein, a document can refer to the DOM's underlying document.

The unallocated RP menu rendering application can be configured to be executable on the agent workstations 120 and can follow a model-view-controller (MVC) design pattern for user interfaces. According to the MVC design pattern, an application can be divided into three areas of responsibility, including: (1) the Model, which includes the domain objects or data structures that represent the application's state; (2) the View, which observes the state and generates an output to the users; and, (3) the Controller, which translates user input into operations on the model.

An unallocated request package can be selected from the unallocated RP menu by one of the agent workstations 120 and a request package selection can be transmitted by the agent workstation 120 to the IO call system 130.

The RP generator 275 can include gamification that increases a likelihood that all unallocated request packages are promptly selected by agent workstations 120. For example, the RP generator 275 can employ game methods to create incentives for the operator agents at the agent workstations 120 to select the unallocated request package that most needs to be done. The controller 200 can include a portion or the entirety of the system 100 described in U.S. Pat. No. 8,897,437, titled "Method and System for Improving Call-Participant Behavior Through Game Mechanics," issued on Nov. 25, 2014, the entirety of which is hereby incorporated herein by reference. Using the methods described in U.S. Pat. No. 8,897,437, the controller 200 can validate how well the request package is handled by the agent workstation 120 (or operator agent using the workstation), score the agent workstation 120 (or operator agent), and update the workstation's (or operator agent's) skills and qualifications.

The unallocated RP menu can be viewed on the agent workstation 120 and a caller request selected by an operator agent who would like to, and is skilled at fulfilling the selected caller request. Alternatively, the agent workstation 120 can directly access and retrieve unallocated request packages through a request package interface (not shown) that has access to the RP administrator 275B (shown in FIG. 4) or the RP database (not shown). The request package interface can be created and provided by the RP generator 275. The request package interface can include the unallocated RP menu.

The game mechanics (i.e. gamification) can create incentives for operator agents to select all unallocated request packages in the unallocated RP menu, including the caller requests that are more complicated or require higher levels of skill. Game mechanics can enhance the operator agents' intrinsic motivation to perform efficiently and at high levels. An operator agent, via an agent workstation 120, can select an unallocated request package based on, for example, the operator agent's skills and qualifications, after which the agent workstation 120 can prepare for an outbound call, which the controller 200 can initiate and connect to the communicating device 110 that is associated with the selected request package.

As the request package is being selected and researched by an operator agent, the controller 200 can generate and transmit a message to the communicating device 110. The message can include a status update generated by the caller notification unit 285, so the caller can know the operator agent that will be calling back and when to expect the call. The message can include, for example, an operator agent or agent workstation 120 identifier (e.g., a name, an employee number, an agent number, a telephone number, or the like), and a date and time of a scheduled call from the agent workstation 120.

The RP allocator 280 can receive the transmitted request package selection from the agent workstation 120 and assign the selected request package to that agent workstation 120. The RP allocator 280 can repeat the process as many times as necessary to ensure selection of all unallocated request packages by one or more agent workstations 120. The RP allocator 280 can initiate, connect and establish a call session between an agent workstation 120 that selected a request package and the communicating device 110 that was the source of that request package. The RP allocator 280 can carry out all appropriate pre-call steps to ensure that the caller request can be resolved during a single outbound call session. The RP allocator 280 can include an outbound dialer module (not shown) that can initiate an outbound call to the communicating device 110 that was the source of the selected request package and connect that communicating device 110 with the agent workstation 120 that selected the request package.

The caller notification unit 285 can generate and send a status update signal to the communicating device 110 that was the source of the request package. The caller notification unit 285 can employ multiple modes of communication to provide the status update to the communicating device 110. For instance, the caller notification unit 285 can create and send a short message service (SMS) message, an email message, a voice message, or the like. The status update can be sent to the communicating device 110 once the associated request package is selected by an agent workstation 120. The status update can be sent before the agent workstation 120 and the communicating device 110 are connected. Once a voice connection is made between the agent workstation 120 and communicating device 110, voice and speech analysis can be carried out by the call analytics unit 290.

The call analytics unit 290 can analyze voice and speech signals to monitor and rate the quality of the interaction between the caller and the operator agent. Results of the analysis can be sent to the agent workstation 120 for the purposes of improving operator agent performance. The results can be sent to the CR agent 270 for refining classification of future incoming caller requests. The call analytics unit 230 can include components of the system 100 described in U.S. Pat. No. 8,897,437, to validate how well the request package is handled by the agent workstation 120 (or operator agent), score the agent workstation 120 (or operator agent), and update the agent workstation's (or operator agent's) skills and qualifications.

The controller 200 can implement one or more of a plurality of novel operational strategies, including: reversing the flow of calls from communicating devices 110 from inbound to outbound by introducing, for example, the CR agent 270, including a conversational BOT, to service the initial interaction; displaying an unallocated RP menu on one or more agent workstations 120 and, thereby, putting the assignment of work in the hands of the operator agents using a gamified system of incentives instead of a system like an automated call distributor (ACD); and, providing direct performance feedback via the caller analytics unit 290 to the agent workstation 120 (or operator agent) instead of relying on an intermediary like a quality rater or a supervisor. In reversing the call flow, two of the goals are to reduce immediate demand (schedule a call back), and to provide an opportunity for pre-call preparation.

Figure 4:
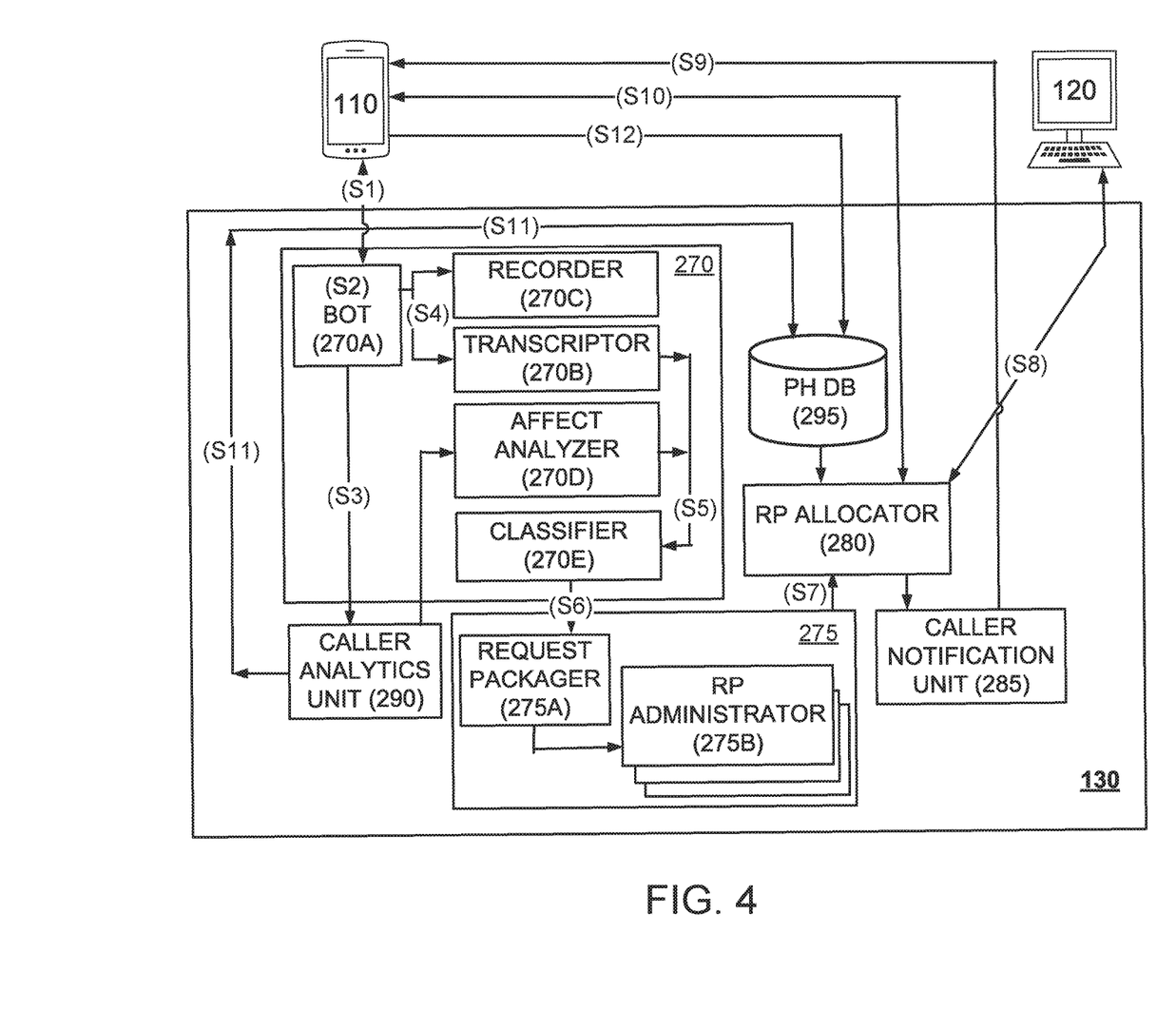
FIG. 4 shows an example of a flow diagram of for the IO call system in FIG. 1.

The CR agent 270 can classify caller requests in inbound calls using, for example, the conversational BOT 270A (shown in FIG. 4), a transcriptor 270B (shown in FIG. 4), a recorder 270C (shown in FIG. 4), an affect analyzer 270D (shown in FIG. 4), and a classifier 270E (shown in FIG. 4). The conversational BOT 270A can facilitate a natural interaction with the caller and a recording and a transcription of the interaction can be generated by the recorder 270C and the transcriptor 270B, respectively. The RP allocator 280 can carry out the assignment of unallocated request packages in response to RP selections received from agent workstations 120, to facilitate reversal of the call flow and the integration of gamification for both on call performance improvement and for request selection optimization.

The CR agent 270 can include the classifier 270E (shown in FIG. 4), which can include a support vector machine (SVM) to classify caller requests, or any other classification algorithm (including nonlinear classification algorithm) as understood by those skilled in the art without departing from scope or spirit of the disclosure. The classifier 270E can implement, for example, supervised learning models with associated learning algorithms that analyze call data for classification and regression analysis, as known in the art. Given a set of training examples, each identified as belonging to one or the other of the two categories, the training algorithm can build a model that assigns new examples to one category or the other. The SVM classification algorithms can include, for example, sub-gradient descent or coordinate descent algorithms. In the case of nonlinear classification, the classifier 270E can include a common kernel such as, for example, a homogenous polynomial kernel, a non-homogeneous polynomial kernel, a Gaussian radial kernel, a hyperbolic tangent kernel, or the like.

FIG. 4 shows an example of a flow diagram of for the IO call system 130 in FIG. 1 (and controller 200, shown in FIG. 3). Referring to FIGS. 1, 3, and 4, the communicating device 110 can initiate a call over the network 150 by, for example, calling a predetermined telephone number that is associated with the call center 140. The call may be received from the communicating device 110 by the IO call system 130 (Step S1). The caller may be seeking information about a product or service. Once the communicating device 110 and IO call system 130 are connected and a call session established over the network 150, the conversational BOT 270A can be activated to engage the caller (Step S2). The BOT 270A can solicit the caller's needs in unstructured natural language. For example, the BOT 2701 can communicate an open-ended query to the communicating device 110, such as, for example, "what can I help you with?"

The caller analytics unit 290 can be engaged (Step S3) and a voice analysis module (e.g., as described in U.S. Pat. No. 8,897,437) in the caller analytics unit 290 can analyze the caller's affect as well as other non-verbal signals indicating urgency, gender, etc. The transcriptor 270B and recorder 270C can be engaged to transcribe and record the caller's response, including the caller request, respectively (Step S4). The BOT 270A may then complete the initial interaction with the caller.

The classifier 270E can implement a classification algorithm to classify the caller request and create a descriptor for the caller request (Step S5). The caller request classification, descriptor and/or caller request can be sent to a request packager 275A in the RP generator 275 (Step S6). The request packager 275A can generate a request package based on a plurality of dimensions including, for example, caller request type, complexity, caller type, urgency, emotion, etc. If a caller request falls into a classification that can be serviced without the need for an operator agent interaction, then the request package be sent for fulfillment to a self-service function (not shown), otherwise the request package is tagged as an unallocated request package. The unallocated request package can be sent to the RP database, where the unallocated request package can be stored with other request packages, including other unallocated request packages. The unallocated request package can be stored in local memory (e.g., RAM 224, shown in FIG. 3). The unallocated request package can be combined with other unallocated request packages (if any) by the RP administrated 275B and included in an unallocated RP menu generated by the RP generator 275. The unallocated RP menu can be made accessible or transmitted to one or more agent workstations 120, as discussed above, such that qualified operator agents can select unallocated request packages for work from the unallocated RP menu.

The RP allocator 280 ensures that all unallocated request packages are selected by agent workstations 120. The RP allocator 280 can include a gamified request broker (not shown) that can implement variable incentives (e.g., bonus points and point multipliers) to make the selection of more urgent, higher complexity, or higher effort unallocated request packages more desirable to operator agents. For instance, the gamified request broker can assign initial point values to each unallocated request package based on, for example, the type and complexity of the request. Additional point values or multipliers can be added based on urgency or caller affect (e.g., emotion). In general, the gamified request broker can assign higher point values to more complex request packages, more urgent request packages, or request packages that are is likely to lead to more emotionally complex interactions. The point values can be changed by the gamified request broke until an agent workstation 120 selects the unallocated request package. For example, an unallocated request package that goes unselected for a period of time can be increased in point value to make it a more desirable selection. Other unallocated request packages of types that are selected often may lose point multipliers to make the selection of those request packages less desirable. Regardless of point value, however, unallocated request packages can include a permission field that restricts selection of the request package by only those operator agents (or agent workstations 120) that possess a minimum qualification for that request package type and request package complexity. For instance, an operator agent may be qualified to select a customer service request, but not a technical support request. Moreover, an operator agent may be qualified to select a basic customer service request but not a complex customer service request. Satisfactory performance of a selected request package can earn the point values assigned to that request package, plus potential bonus multipliers for outstanding performance as determined by the caller analytics unit 290 (e.g., as described in U.S. Pat. No. 8,897,437). Continual satisfactory performance on certain request package types can result in an increase in the level of qualification for the operator agent, which can lead to additional choices and types of unallocated request packages made selectable by the operator agent. The gamified request broker can use game mechanics such as leaderboards, badges and reputation points to provide further incentives for operator agents to select and fulfill priority unallocated request packages.

Gamification, as described in U.S. Pat. No. 8,897,437, can be used in the gamified request broker. The gamification can be implemented to incentivize optimal work distribution in the call center 140 (shown in FIG. 1). Additionally, the IO call system 130 can implement direct performance feedback in the call center 140 (shown in FIG. 1) during the call by displaying visual cues on the agent workstation 120 to the operator agent, as described in U.S. Pat. No. 8,897,437.

Once an unallocated request package is selected by an agent workstation 120 and the RP selection received by the controller 200, the RP allocator 280 cam assign the selected unallocated request package to the agent workstation 120 and interact with the agent workstation 120 to prepare for an outbound call (including voice contact) to the communicating device 110 associated with the selected request package (Step S8). The agent application (not shown) can interact with the agent workstation 120 to prepare the operator agent for the outbound call. The agent application (not shown) can refer to operational systems required for the fulfillment of the caller request (e.g., order entry systems, knowledge management systems, etc.) in the request package. The RP allocator 280 can include an agent application (not shown) that is substantially the same as that described in U.S. Pat. No. 8,897,437, the disclosure of which has been incorporated herein in its entirety.

After an unallocated request package is selected by an agent workstation 120, and during operator agent preparation activities, the caller notification unit 285 can generate and transmit one or more messages to the communicating device 110 (Step S9). The message may include the status of the caller request, an operator agent's name, a scheduled call date/time, a reply to the caller request, an identifier (e.g., telephone number) for the agent workstation 120, or the like. The message can be transmitted by the caller notification unit 285 as an SMS message, an MMS (Multimedia Message Service), an Internet instant message, an email, a voicemail, or the like, which can be reproduced by the communicating device 110 to the caller.

When the operator agent is prepared for the outbound call to the communicating device 110, the agent workstation 120 can initiate contact and connect to the communicating device 110 through the RP allocator 280, which can include an outbound dialer (not shown) (Step S10). As discussed in U.S. Pat. No. 8,897,437, the entire interaction can be analyzed for quality, and performance feedback can be collected to update operator agent (or agent workstation 120) qualifications for selecting additional unallocated request packages (Step S11). Points can be accrued and posted to the operator agent's account to acknowledge the completion of the call. After the conversation terminates, the caller can be given an opportunity to provide operator agent performance feedback to also influence operator agent qualifications for selecting work (Step S12).

Compared to existing call centers, the call center 140, when coupled to the IO call system 130, can experience improved resource utilization by having inbound requests restructured as outbound requests. Existing inbound call centers, based on the unpredictable nature of call arrivals necessarily run with low on-phone occupancy (e.g., 50%-60%), while outbound call centers run more efficiently (e.g., 85%). The IO call system 130 improves caller experiences by affording the operator agents the information and time required to prepare for an interaction before starting a call with the communicating device 110, thereby resulting in less wasted time on the phone, no need to transfer or escalate the call, and connecting the caller of the communicating device 110 with a prepared operator agent. The IO call system 130 solves the problem of low job satisfaction in the call center 140 by giving operator agents autonomy over what kind of work they do and at what time, gamification ensures that work always gets done while introducing an element of fun into the job.

A non-transitory computer readable medium can be provided containing a computer program, which when executed on one or more of the computing devices in the IO call system 130, causes the processes in FIG. 2 or 4 to be carried out by the IO caller system 130. The computer program can be tangibly embodied in the computer readable medium, comprising one or more program instructions, code segments, or code sections for performing each of the Steps S1 through S12 in FIG. 4 when executed by one or more computing devices in the IO call system 130.

The terms "a," "an," and "the," as used in this disclosure, mean "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a cellular telephone, a satellite telephone, a landline (e.g., PSTN) telephone, a smart phone, a voice-over-Internet-Protocol (VoIP) transceiver, a personal data assistant (PDA), a smart watch, a tablet, a software defined radio (SDR), a computer having video or audio reception and production capabilities, or the like. The hardware, firmware, or software can include a user interface that can display, announce, or otherwise provide information to a user, and that can receive data or instructions from a user, including data or instructions input by touch, sound, gesture (e.g., hand-gestures), eye-movement, or the like. The user interface can include, for example, a graphic user interface (GUI), a display, a keyboard, a mouse, a speaker, a microphone, a camera, an image pickup device, or the like.

The term "communication link," as used in this disclosure, means a wired or wireless medium that conveys data or information between at least two points. A communication link can include a network. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G, 4G or 5G cellular standards, Bluetooth, or the like. A communication(s) link can include a public switched telephone network (PSTN) line, a voice-over-Internet-Protocol (VoIP) line, a cellular network link, an Internet protocol link, or the like. The Internet protocol may include an application layer (e.g., BGP, DHCP, DNS, FTP, HTTP, IMAP, LDAP, MGCP, NNTP, NTP, POP, ONC/RPC, RTP, RTSP, RIP, SIP, SMTP, SNMP, SSH, Telnet, TLS/SSL, XMPP, or the like), a transport layer (e.g., TCP, UDP, DCCP, SCTP, RSVP, or the like), an Internet layer (e.g., IPv4, IPv6, ICMP, ICMPv6, ECN, IGMP, IPsec, or the like), and a link layer (e.g., ARP, NDP, OSPF, Tunnels (L2TP), PPP, MAC (Ethernet, DSL, ISDN, FDDI, or the like), or the like).

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The term "database," as used in this disclosure, means any combination of software or hardware, including at least one application or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, a satellite network, a cable network, a public switched telephone network (PSTN), the Internet, or the like, or any combination of the foregoing, any of which can be configured to communicate data via a wireless or a wired communication medium. These networks can run a variety of protocols, including, but not limited to TCP/IP, UDP, IRC, HTTP, etc.

The term "request package," as used in this disclosure, means a file, a record, or a collection containing one or more units of data or information, which can include a request, a descriptor of a request, a query, an instruction, or the like, that is received from a communicating device during a single call session. The "request package" can include one or more packets, such as, for example, a data packet, a datagram, a data frame, a network packet, or the like. The "request package" can include a data header that identifies the communicating device, including addressing associated with the communicating device, such as, for example, an IP address, a MAC address, a telephone number, or the like. The "request package" can include a data payload that includes portions or the entirety of the units of data or information received from the communicating device.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The terms "transmission" or "transmit," as used in this disclosure, means the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "workstation," as used in this disclosure, means any combination of software or hardware, including at least one application or at least one computer. A "workstation" can include a computer. A "workstation" can include a communicating device.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article can be used in place of a single device or article. Similarly, where more than one device or article is described herein, it will be readily apparent that a single device or article can be used in place of the more than one device or article. The functionality or the features of a device can be alternatively embodied by one or more other devices which are not explicitly described as having such functionality or features.

The illustrated aspects of the disclosure can be practiced in distributed computing environments where certain tasks are performed by remote processing devices that are linked through a network. In a distributed computing environment, program modules can be located in both local and remote memory storage devices.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. An inbound-outbound call system that converts an inbound call from a communicating device to an outbound call to the communicating device, the inbound-outbound call system comprising:
   a call response agent that receives the inbound call from the communicating device;
   a speech-enabled automated agent that that interacts with the communicating device to solicit a caller's response in unstructured natural language and receive an audio signal containing the caller's unstructured natural language response;
   a classifier having a machine learning model that
      analyzes the audio signal, including the caller's unstructured language response,
      determines a caller request based on the audio signal, and
      creates a descriptor for the caller request;
   a request package generator that creates an unallocated request package based on the caller request and the descriptor for the caller request; and
   a request package allocator arranged to allocate the unallocated request package to an agent workstation,
   wherein the request package allocator is further arranged to provision an outbound call to the communicating device based on the request package, thereby converting the inbound call to the outbound call.

2. The inbound-outbound call system of claim 1, wherein the request package generator creates an unallocated request package menu and includes the unallocated request package in the unallocated request package menu.

3. The inbound-outbound call system of claim 2, wherein the unallocated request package menu is sent to the agent workstation and rendered on a display device at the agent workstation.

4. The inbound-outbound call system of claim 2, wherein the unallocated request package is selected from the unallocated request package menu by the agent workstation.

5. The inbound-outbound call system of claim 4, wherein the request package allocator assigns the unallocated package to the agent workstation.

6. The inbound-outbound call system of claim 5, wherein the request package allocator comprises an outbound dialer that initiates the outbound call to the communicating device and connects the communicating device with the agent workstation.

7. The inbound-outbound call system of claim 1, further comprising:
   a caller notification unit that generates and sends a status update message to the communicating device.

8. The inbound-outbound all system of claim 7, wherein the status update message includes a status of the caller request.

9. The inbound-outbound call system of claim 5, further comprising:
   a caller notification unit that generates and sends a status update message to the communicating device,
   wherein the status update message is sent to the communicating device after the request package allocator assigns the unallocated request package to the agent workstation.

10. The inbound-outbound call system of claim 1, further comprising:
    a gamified request broker that ensures that all unallocated request packages are selected by one or more agent workstations.

11. The inbound-outbound call system of claim 10, wherein the gamified request broker prioritizes and incentivizes selection of higher priority unallocated request packages by the one or more agent workstations.

12. The inbound-outbound call system of claim 11, wherein the unallocated request packages are prioritized based on at least one of a level of urgency, a degree of complexity, or a degree of effort required to respond to the caller request.

13. The inbound-outbound call system of claim 1, further comprising:
    a recorder that stores the audio signal, including a natural interaction between a caller on the communicating device and the speech-enabled automated agent.

14. The inbound-outbound call system of claim 1, further comprising:
    a transcriptor that transcribes a natural interaction between a caller on the communicating device and the speech-enabled automated agent.

15. A method for converting an inbound call from a communicating device to an outbound call to the communicating device, the method comprising:
    receiving the inbound call from the communicating device;
    interacting with the communicating device by a speech-enabled automated agent to solicit a caller's response in unstructured natural language and receive an audio signal containing the caller's unstructured natural language response;
    analyzing the audio signal by a machine learning model to determine a caller request based on the audio signal and create a descriptor for the caller request;
    creating an unallocated request package based on the caller request and the descriptor for the caller request;
    allocating the unallocated request package as a request package to an agent workstation; and
    converting the inbound call to an outbound call to the communicating device based on the request package.

16. The method of claim 15, further comprising:
creating an unallocated request package menu and including the unallocated request package in the unallocated request package menu.

17. The method of claim 16, further comprising:
sending the unallocated request package menu to a plurality of agent workstations to be rendered on display devices at the agent workstations.

18. The method of claim 17, further comprising:
receiving a request packet selection from one of the plurality of agent workstations; and
assigning the unallocated request package to said one of the plurality of agent workstations.

19. The method of claim 18, further comprising:
initializing the outbound call and calling the communicating device; and
connecting the communicating device with the said one of the plurality of agent workstations.

20. The method of claim 18, further comprising:
generating a status message that indicates that the unallocated request package is assigned to said one of the plurality of agent workstations; and
sending the status message to the communicating device.

21. The method of claim 15, wherein the unallocated request package comprises at least one of a request type, a complexity level, a caller type, an urgency level, and an emotion descriptor.

* * * * *